United States Patent
Shimamoto (10) Patent No.: US 9,462,154 B2
(45) Date of Patent: Oct. 4, 2016

(54) IMAGE PROCESSING DEVICE AND FACSIMILE MACHINE

(71) Applicant: KYOCERA Document Solutions Inc., Osaka-shi (JP)

(72) Inventor: Kunihiko Shimamoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/750,727

(22) Filed: Jun. 25, 2015

(65) Prior Publication Data
US 2015/0381855 A1    Dec. 31, 2015

(30) Foreign Application Priority Data

Jun. 26, 2014  (JP) .................................. 2014-130909

(51) Int. Cl.
  *H04N 1/64*   (2006.01)
  *H04N 1/32*   (2006.01)
  *H04N 1/00*   (2006.01)
  *H04N 1/41*   (2006.01)

(52) U.S. Cl.
  CPC ........ *H04N 1/32459* (2013.01); *H04N 1/0022* (2013.01); *H04N 1/32368* (2013.01); *H04N 1/41* (2013.01)

(58) Field of Classification Search
  None
  See application file for complete search history.

(56) References Cited

U.S. PATENT DOCUMENTS 5,075,784 A * 12/1991 Momose ............ H04N 1/00002
                                                    358/447
5,930,005 A * 7/1999 Yoshida ............... H04N 1/2307
                                                    358/448
9,064,324 B2   6/2015 Ooguni
2013/0257882 A1 10/2013 Ooguni

FOREIGN PATENT DOCUMENTS

| JP | H03-030571 A | 2/1991 |
| JP | H05-083520 A | 4/1993 |
| JP | 2002-094782 A | 3/2002 |
| JP | 2007-081689 A | 3/2007 |
| JP | 2013-214151 A | 10/2013 |

OTHER PUBLICATIONS

An Office Action; "Notice of Reasons for Rejection," issued by the Japanese Patent Office on Jun. 9, 2016, which corresponds to Japanese Patent Application No. 2014-130909 and is related to U.S. Appl. No. 14/750,727.

* cited by examiner

*Primary Examiner* — King Poon
*Assistant Examiner* — Pawandeep Dhingra
(74) *Attorney, Agent, or Firm* — Studebaker & Brackett PC (57) ABSTRACT

An image processing device reduces an image in a sub-scanning direction at a reduction factor of $\frac{1}{2}^N$ (N>1) and includes one or more ASICs each of which performs image reduction at a reduction factor of 50%. When the one or more ASICs perform the image reduction processing in N stages each at the reduction factor of 50%, one of the ASICs performs an i-th stage of the image reduction processing at 50% (N−1≥i≥1) and stores resulting image data into a buffer memory that is equal in size to $\frac{1}{2}^i$ of one band. Then, one of the ASICs performs an (i+1)-th stage of the image reduction processing at 50% on the image data acquired through the i-th stage of the image reduction processing and stores resulting image data into a buffer memory that is equal in size to $\frac{1}{2}^{i+1}$ of one band.

3 Claims, 7 Drawing Sheets

IMAGE PROCESSING DEVICE AND FACSIMILE MACHINE

INCORPORATION BY REFERENCE

The present application claims priority under 35 U.S.C. §119 to Japanese Patent Application No. 2014-130909, filed Jun. 26, 2014. The contents of this application are incorporated herein by reference in their entirety.

BACKGROUND

The present disclosure relates to image processing devices and facsimile machines.

A facsimile machine performs capability exchange with a communication partner device before starting facsimile transmission or reception. Through the capability exchange, the facsimile machine determines the capability of the communication partner device, such as a maximum printable sheet size and a maximum resolution. Depending on the maximum printable sheet size or resolution of the communication partner device, the facsimile machine reduces an image using a built-in image processing device and then transmits the resulting image data to the communication partner device.

SUMMARY

An image processing device according to a first aspect of the present disclosure performs image reduction processing of reducing an image in a sub-scanning direction at a reduction factor of $1/2^N$, where N>1. The image processing device includes one or more hardware processing circuits each configured to perform image reduction at a reduction factor of 50%. When the one or more hardware processing circuits perform the image reduction processing in N stages each at the reduction factor of 50%, one of the one or more hardware processing circuits performs an i-th stage of the image reduction processing at the reduction factor of 50%, where N−1≥i≥1, and stores image data acquired through the i-th stage of the image reduction processing into a buffer memory that is equal in size to $1/2^i$ of one band. After the image data acquired through the i-th stage of the image reduction processing is stored into the buffer memory, one of the one or more hardware processing circuits performs an (i+1)-th stage of the image reduction processing at the reduction factor of 50% on the image data acquired through the i-th stage of the image reduction processing and stores image data acquired through the (i+1)-th stage of the image reduction processing into a buffer memory that is equal in size to $1/2^{i+1}$ of one band.

A facsimile machine according to a second aspect of the present disclosure includes: the image processing device according to the first aspect of the present disclosure; a codec; and a communication device. The codec converts image data into a facsimile signal, the image data having been generated and stored into the buffer memory that is equal in size to $1/2^{i+1}$ of one band by the image processing device. The communication device sends the facsimile signal generated by the codec.

DETAILED DESCRIPTION

The following describes embodiments of the present disclosure with reference to the accompanying drawings.

Embodiment 1

Figure 1:
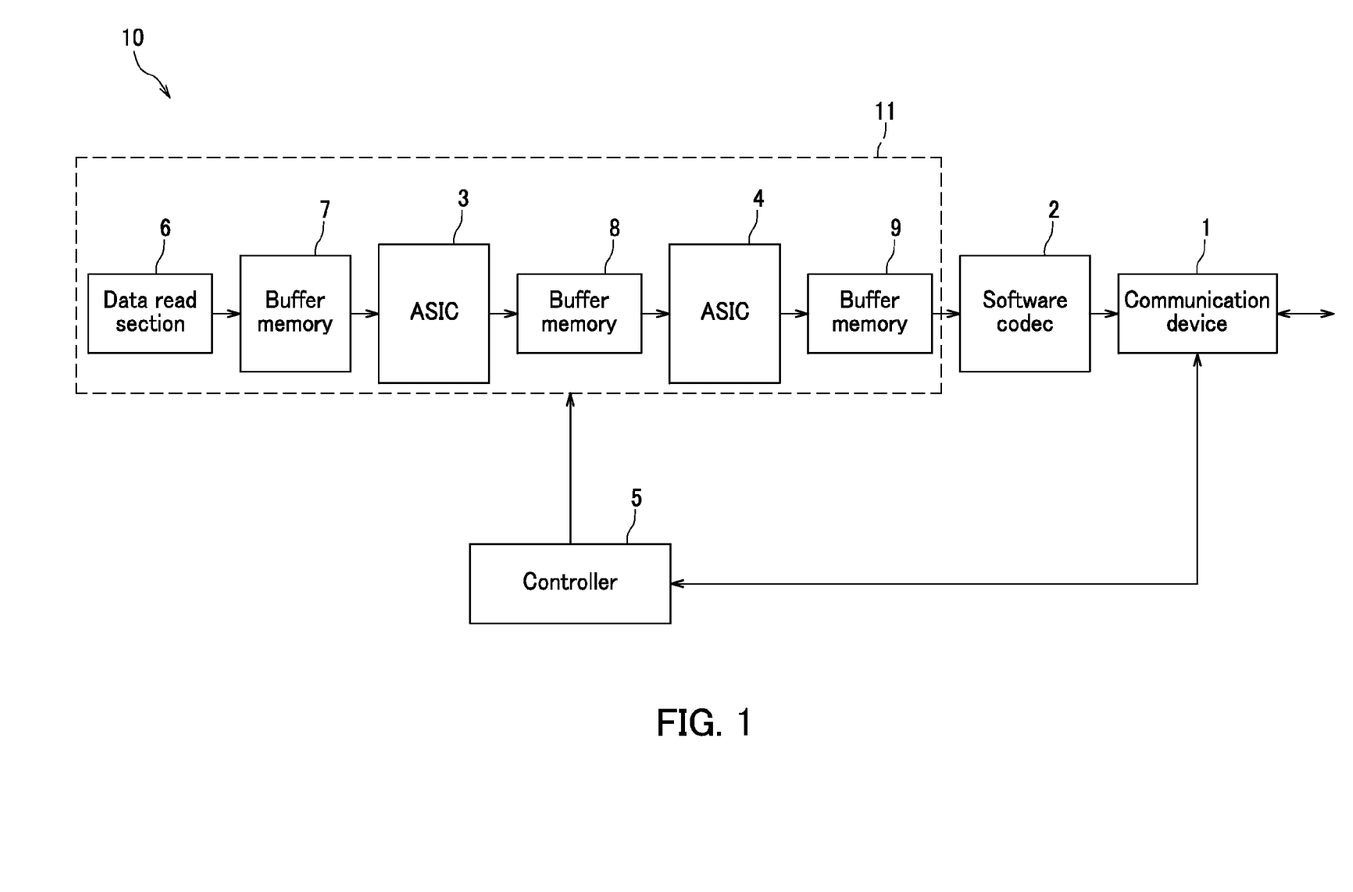
FIG. 1 is a block diagram showing the structure of a facsimile machine according to Embodiment 1 of the present disclosure.

FIG. 1 is a block diagram showing the structure of a facsimile machine 10 according to Embodiment 1 of the present disclosure.

The facsimile machine 10 shown in FIG. 1 includes an image processing device 11. The image processing device 11 performs image reduction processing of reducing an image in a sub-scanning direction at a reduction factor of $1/2^N$ (where N>1; i.e., N is an integer greater than 1).

The image processing device 11 includes one or more application specific integrated circuits (ASICs). The one or more ASICs perform the image reduction processing in N stages in the sub-scanning direction, and each of the N stages is performed at a reduction factor of 50%.

More specifically, when the image processing device 11 includes one ASIC, the one ASIC performs the i-th stage (where N−1≥i≥1) of the image reduction processing at a reduction factor of 50%. Then, the one ASIC stores image data acquired through the i-th stage of the image reduction processing into a buffer memory that is equal in size to $1/2^i$ of one band. Immediately after the image data acquired through the i-th stage of the image reduction processing is stored into the buffer memory that is equal in size to $1/2^i$ of one band, the one ASIC performs the (i+1)-th stage of the image reduction processing at a reduction factor of 50% on the image data acquired through the i-th stage of the image reduction processing and stores image data acquired through the (i+1)-th stage of the image reduction processing into a buffer memory that is equal in size to $1/2^i+1$ of one band.

On the other hand, when the image processing device 11 includes a plurality of ASICs, one of the ASICs performs the i-th stage (where N−1≥i≥1) of the image reduction processing at a reduction factor of 50%. Then, the one of the ASICs stores image data acquired through the i-th stage of the image reduction processing into a buffer memory that is equal in size to $1/2^i$ of one band. Immediately after the image data acquired through the i-th stage of the image reduction processing is stored into the buffer memory that is equal in size to $1/2^i$ of one band, another one of the ASICs performs the (i+1)-th stage of the image reduction processing at a reduction factor of 50% on the image data acquired through the i-th stage of the image reduction processing and stores image data acquired through the (i+1)-th stage of the image reduction processing into a buffer memory that is equal in size to $1/2^i+1$ of one band.

One band is composed of $2^M$ lines (for example, 128 lines). The term "band" refers to a rectangular region of an image acquired when the image is partitioned into a plurality of rectangular regions in the sub-scanning direction. The term "line" refers to a partial image acquired when an image is partitioned into a plurality of lines in the sub-scanning direction.

The image processing device 11 includes two ASICs (ASIC 3 and ASIC 4). The facsimile machine 10 that includes the image processing device 11 uses the two AISCs to reduce an image ultimately to 25% of its initial size and transmits the resulting image to a communication partner device. The ASICs 3 and 4 each perform image reduction processing at a reduction factor of 50% in a sub-scanning direction. The structure of the facsimile machine 10 shown in FIG. 1 is merely one example.

A communication device 1 is a circuit for communicating with a communication partner device. The communication device 1 performs capability exchange with the communication partner device. A software codec 2 converts image data into a facsimile signal. The communication device 1 sends a facsimile signal generated by the software codec 2 to the communication partner device.

Each of the ASICs 3 and 4 is a hardware processing circuit that performs image reduction processing at a reduction factor of 50% in the sub-scanning direction.

A controller 5 determines a reduction factor (for example, 25%) for facsimile transmission to a communication partner device based on the result of capability exchange performed by the communication device 1. In other words, the controller 5 determines the value of N mentioned above. The controller 5 then determines the processing path (as shown in FIG. 1, for example) that results in the image reduction processing to ultimately reduce the initial image by the thus determined reduction factor.

The facsimile machine 10 supports a plurality of levels of resolutions, such as normal (200 dpi×100 dpi), fine (200 dpi×200 dpi), super-fine (200 dpi×400 dpi), and ultra-fine (400 dpi×400 dpi). With reference to the information obtained through the capability exchange, the controller 5 determines the required reduction factor based on the resolution ratio (in the sub-scanning direction in this example) of the resolutions of the communication partner device and the facsimile machine 10.

The following describes an example in which the required reduction factor determined by the controller 5 is 25%. The controller 5 allocates a buffer memory 7 that is equal in size to one band between a data read section and the ASIC 3. The controller 5 also allocates a buffer memory 8 that is equal in size to ½ of one band between the ASIC 3 and the ASIC 4. The controller 5 also allocates a buffer memory 9 that is equal in size to ¼ of one band between the ASIC 4 and the software codec 2. The data read section 6 reads original image data from for example dynamic random access memory (DRAM).

In Embodiment 1, the following is performed.

(a) The ASIC 3, which is the first ASIC in the processing path, performs the first stage of the image reduction processing at a reduction factor of 50% and stores the resulting image data into the buffer memory 8 that is equal in size to $\frac{1}{2}^1$ (=½) of one band.

(b) Immediately after the image data acquired through the first stage of the image reduction processing is stored into the buffer memory 8 that is equal in size to $\frac{1}{2}^1$ (=½) of one band, the ASIC 4, which is the second ASIC in the processing path reads the image data from the buffer memory 8. Then, the ASIC 4 performs the second stage of the image reduction processing at a reduction factor of 50% on the read image data and stores the resulting image data into the buffer memory 9 that is equal in size to $\frac{1}{2}^2$ (=¼) of one band.

Figure 2:
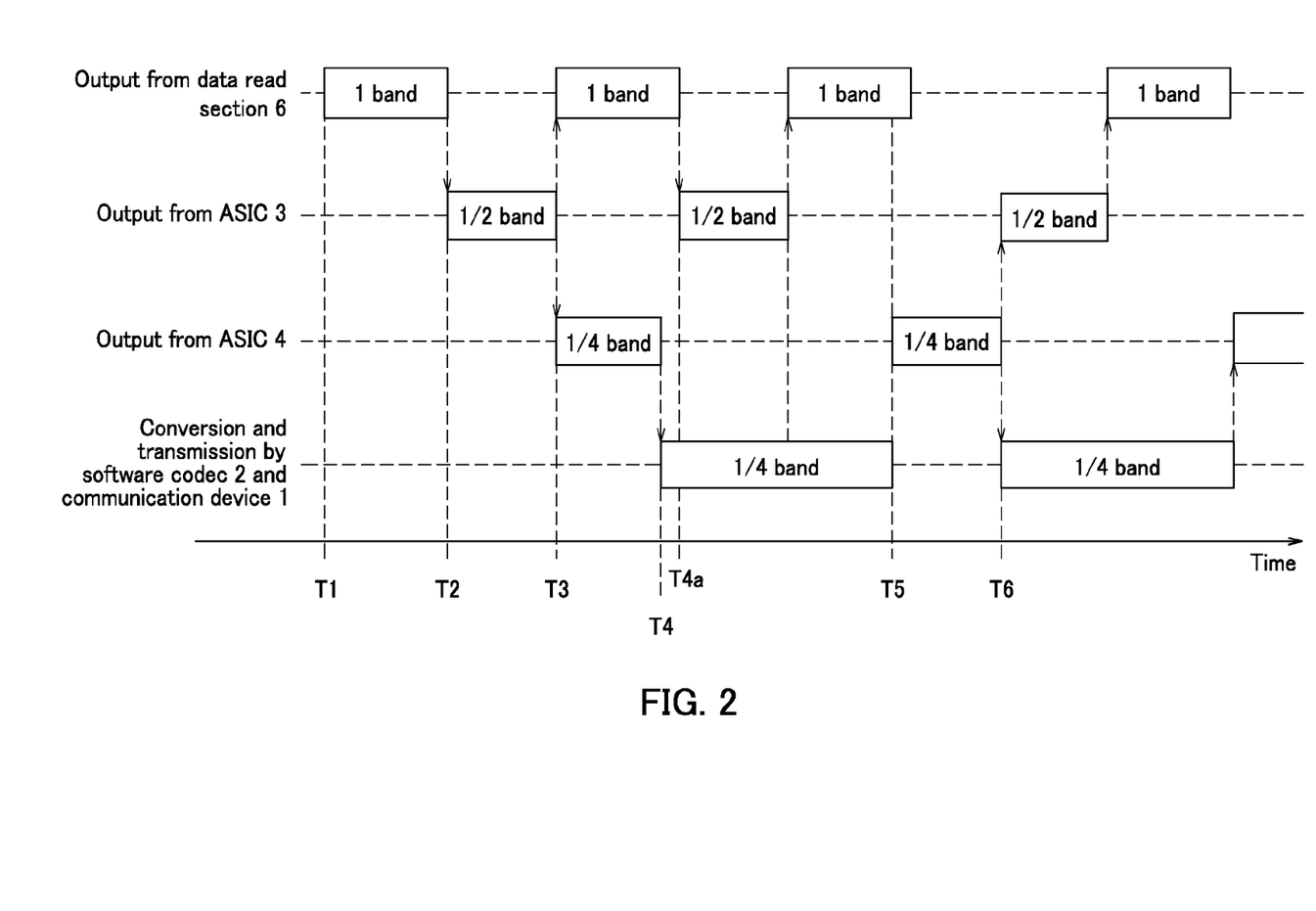
FIG. 2 is a timing chart illustrating the operation of the facsimile machine having the structure shown in FIG. 1.

With reference to FIGS. 1 and 2, the following describes the operation of the facsimile machine 10 according to Embodiment 1. FIG. 2 is a timing chart illustrating the operation of the facsimile machine 10 shown in FIG. 1.

Through capability exchange with a communication partner device, the controller 5 determines that the image reduction processing of ultimately reducing the initial image by a reduction factor of 25% needs to be performed. In this case, the controller 5 sets the image processing device 11 to follow the processing path shown in FIG. 1. Then, the controller 5 controls the image processing device 11 to start the image reduction processing (time T1).

In response, the data read section 6 reads one band of image data and stores the read image data into the buffer memory 7. Upon completion of the reading and the storing (time T2), the ASIC 3 performs the image reduction processing at a reduction factor of 50% on the image data stored in the buffer memory 7. The ASIC 3 stores the image data acquired through the image reduction processing into the buffer memory 8.

Upon completion of the image reduction processing and the storing of the one band of image data to the buffer memory 8 (time T3) by the ASIC 3, the ASIC 4 performs the image reduction processing at the reduction factor of 50% on the image data stored in the buffer memory 8. The ASIC 4 then stores the image data resulting from the image reduction processing to the buffer memory 9.

In one example, one band is composed of 128 lines. In this case, the ASIC 3 converts image data composed of 128 lines into image data composed of 64 lines and stores the resulting image data into the buffer memory 8. The ASIC 4 then converts the image data composed of 64 lines into image data composed of 32 lines and stores the resulting image data into the buffer memory 9.

Upon completion of the image reduction processing on the image data which corresponds to a half band (the image data generated by the ASIC 3 at the reduction factor of 50%) by the ASIC 4 (time T4), the software codec 2 and the communication device 1 start operation to convert the resulting image data, which corresponds to a quarter band stored in the buffer memory 9, into a facsimile signal and to transmit the resulting facsimile signal.

As described above, the transmission of a facsimile signal starts promptly. Note that the software codec 2 and the communication device 1 have a slower processing speed than the ASICs 3 and 4. Consequently, in the above example, once transmission of a facsimile machine starts, almost no latency occurs for the software codec 2 and the communication device 1 (almost no time delay waiting for processing by the ASIC 3 or 4), although the image data stored in the buffer memory 9 corresponds only to ¼ of one band.

At the time T3 described above, the ASIC 3 completes processing on one band image data stored in the buffer memory 7. Consequently at the time T3, the data read section 6 starts reading a subsequent one band of image data and storing the read image to the buffer memory 7. In addition, the ASIC 3 starts the image reduction processing for generating image data of a next ½ band at whichever of the time T4 (completion of the processing by the ASIC 4 on the ½ image data stored in the buffer memory 8) and the time T4a (completion of data read by the data read section 6) that occurs later. Then, the software codec 2 and the communication device 1 start operation to convert the resulting ¼ band image data stored in the buffer memory 9 into a facsimile signal and to transmit the resulting facsimile signal. Upon completion of the conversion and the signal transmission (time T5), the ASIC 4 starts the image reduction processing for generating image data corresponding to a subsequent ¼ band. Upon completion of the image reduction processing by the ASIC 4 (time T6), the software codec 2 and the communication device 1 start operation to convert the subsequent ¼ band image data stored in the buffer memory 9 into a facsimile signal and to transmit the resulting facsimile signal. Thereafter, each component of the facsimile machine 10 operates as shown in FIG. 2.

As has been described above, the image processing device 11 according to the present disclosure includes one ASIC or a plurality of ASICs (the ASICs 3 and 4 according to Embodiment 1). The one or more ASICs perform the image reduction processing in N stages on image data in the sub-scanning direction, and each of the N stages is performed at a reduction factor of 50%.

Figure 5:
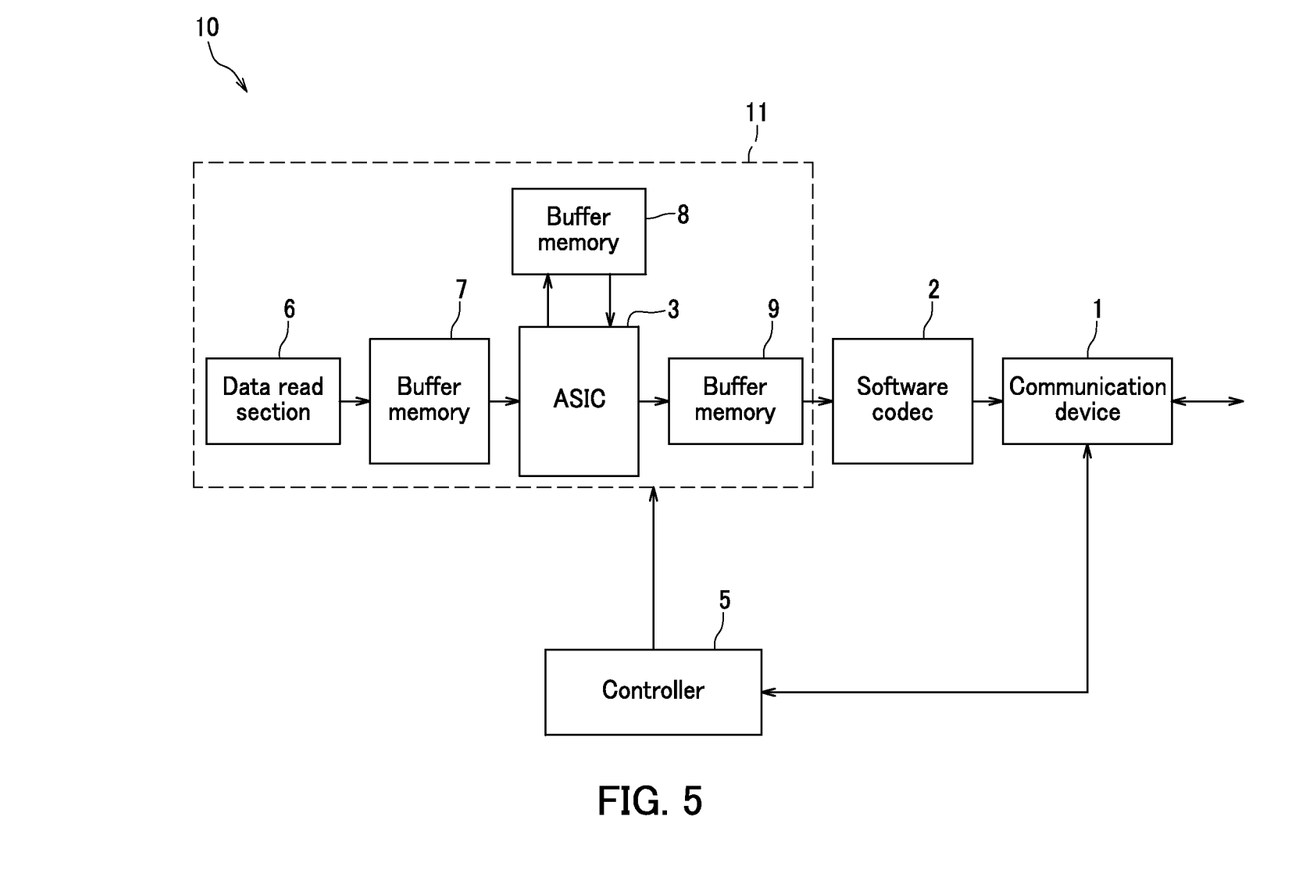
FIG. 5 is a block diagram showing the structure of a facsimile machine according to Embodiment 2 of the present disclosure.

More specifically, when the image processing device 11 includes one ASIC, the one ASIC (ASIC 3 in Embodiment 2, which will be described later) performs the i-th stage (where N−1≥i≥1) of the image reduction processing at a reduction factor of 50% and stores image data acquired through the i-th stage of the image reduction processing into a buffer memory that is equal in size to $\frac{1}{2}^i$ of one band (the buffer memory 8 in Embodiment 2). Immediately after the image data acquired through the i-th stage of the image reduction processing is stored into the buffer memory that is equal in size to $\frac{1}{2}^i$ of one band, the one ASIC performs the (i+1)-th stage of the image reduction processing at a reduction factor of 50% on the image data acquired through the i-th stage of the image reduction processing and stores the resulting image data into a buffer memory that is equal in size to $\frac{1}{2}^i+1$ of one band (the buffer memory 9 in Embodiment 2).

Alternatively, when the image processing device 11 includes a plurality of ASICs, one of the ASICs (the ASIC 3 in Embodiment 1) performs the i-th stage (where N−1≥i≥1) of the image reduction processing at a reduction factor of 50% and image data acquired through the i-th stage of the image reduction processing into a buffer memory that is equal in size to ½i of one band (the buffer memory 8 in Embodiment 1). Immediately after the image data acquired through the i-th stage of the image reduction processing is stored into the buffer memory that is equal in size to $\frac{1}{2}^i$ of one band, another one of the ASICs (the ASIC 4 in Embodiment 1) performs the (i+1)-th stage of the image reduction processing at a reduction factor of 50% on the image data acquired through the i-th stage of the image reduction processing and stores the resulting image data into a buffer memory that is equal in size to $\frac{1}{2}^i+1$ of one band (the buffer memory 9 in Embodiment 1).

In a case where one or more ASICs performs image reduction processing of reducing an image ultimately to the determined reduction factor, the above configuration shortens a time period between the determination of the reduction factor and the start of subsequent operations of the image reduction processing. In addition, the above configuration requires a smaller storage area for each of the buffer memories 8 and 9 for storing data output respectively from the ASICs 3 and 4.

Figure 3:
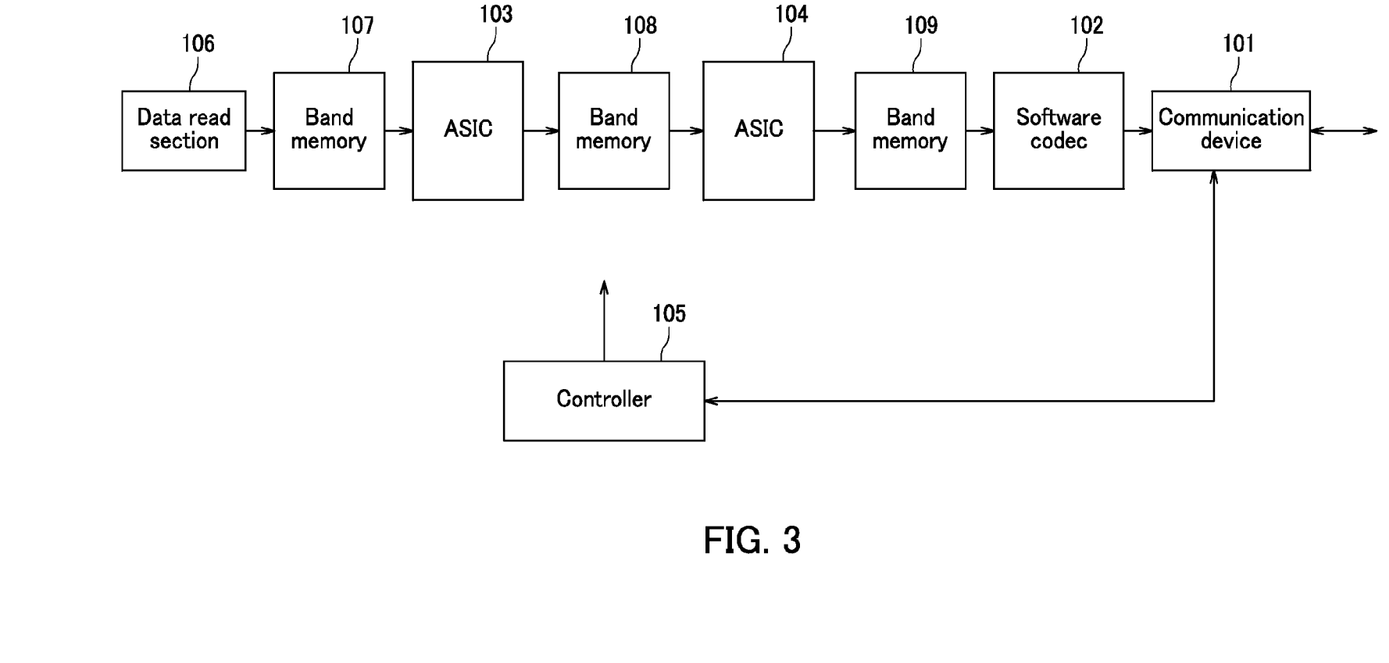
FIG. 3 is a block diagram showing the structure of a facsimile machine according to a comparative example for Embodiment 1.
Figure 4:
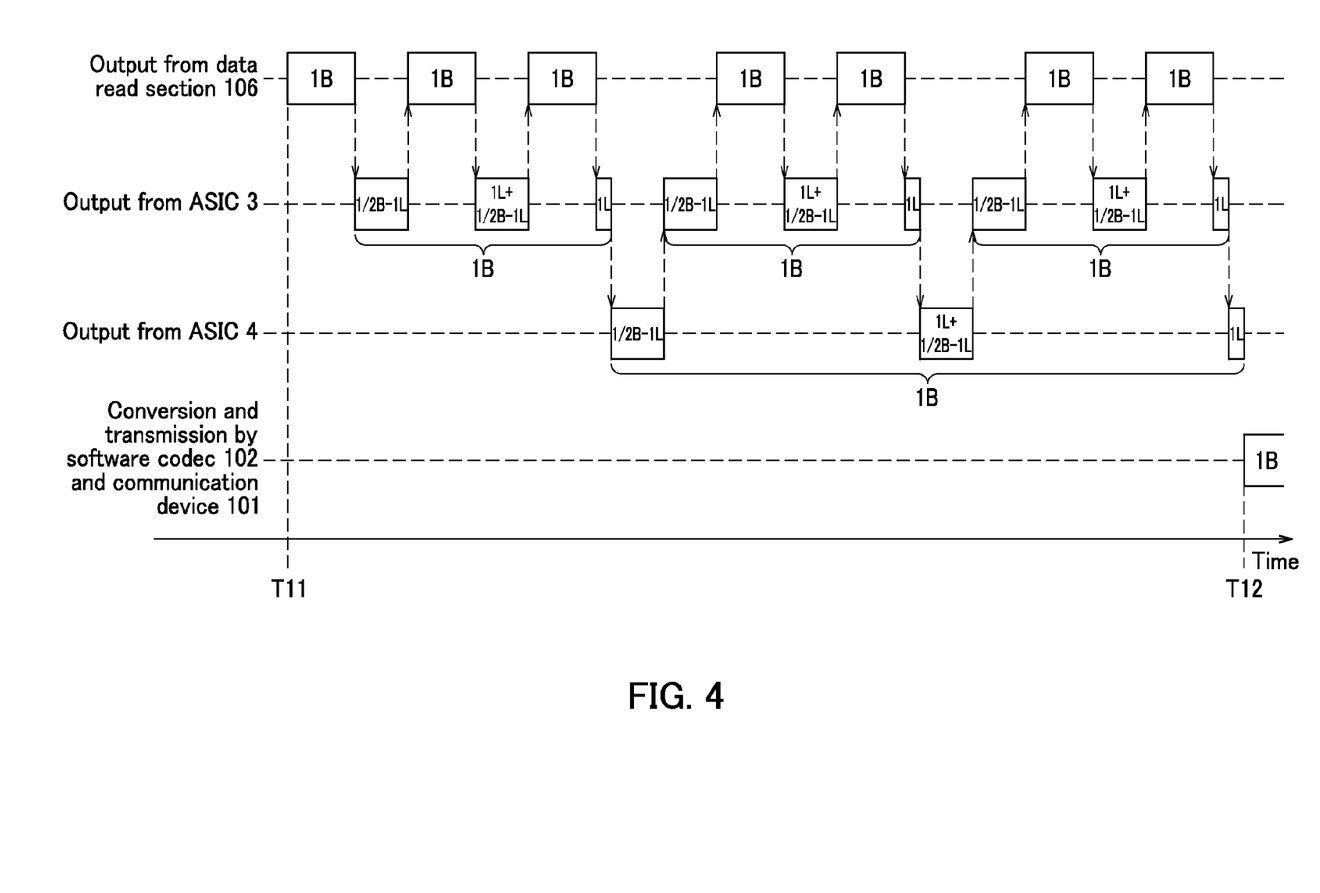
FIG. 4 is a timing chart illustrating the operation of the facsimile machine shown in FIG. 3.

With reference to FIGS. 3 and 4, the following describes a comparative example against Embodiment 1. FIG. 3 is a block diagram showing the structure of a facsimile machine according to the comparative example transmits image data. The image processing device includes two ASICs (ASICs 103 and 104) and causes each of the ASICs to perform image reduction processing at 50% in the sub-scanning direction. The two ASICs reduce an image to 25% of the initial size. The facsimile machine transmits the image obtained through the reduction.

In FIG. 3, a communication device 101 is a circuit for communicating with a communication partner device and performs capability exchange with the communication partner device. A software codec 102 converts image data into a facsimile signal. Each of the ASICs 103 and 104 is a hardware processing circuit that performs image reduction processing at a reduction factor of 50% in the sub-scanning direction. A controller 105 determines a reduction factor (for example, 25%) for facsimile transmission to a communication partner device based on the result of capability exchange performed by the communication device 101. The controller 105 then determines the processing path (as shown in FIG. 3, for example) that results in the image reduction processing to ultimately reduce the initial image to the thus determined reduction factor. When, for example, the determined reduction factor is 25%, the controller 105 allocates a band memory 107 that is equal in size to one band between the data read section 106 and the ASIC 103. The controller 105 also allocates a band memory 108 that is equal in size to one band between the ASIC 103 and the ASIC 104. The controller 105 also allocates a band memory 109 that is equal in size to one band between the ASIC 104 and the software codec 102. The data read section 106 reads original image data from DRAM, for example.

Upon storage of one band of image data into the band memory 107, the ASIC 103 performs image reduction processing at 50% on the one band of image data. The ASIC 103 then stores the image data resulting from the image reduction processing into the band memory 108.

Upon storage of one band of image data into the band memory 108, the ASIC 104 performs image reduction processing at 50% on one band of image data. The ASIC 104 then stores the image data resulting from the image reduction processing into the band memory 109.

Upon storage of one band of image data into the band memory 109, the software codec 102 converts the one band of image data into a facsimile signal. The communication device 101 transmits the facsimile signal to the communication partner device sequentially as it is generated.

For storing one band of image data into the band memory 109, the ASIC 104 needs to perform image reduction processing on two bands of image data. In addition, for the ASIC 104 to perform the image reduction processing on the final line in the image data, the image data of a subsequent line is necessary. That is, one band of image data can be stored into the band memory 109 only after three bands of image data are stored into the band memory 108.

Similarly, for storing one band of image data into the band memory 108, the ASIC 103 needs to perform image reduction processing on two bands of image data. In addition, for the ASIC 103 to perform the image reduction processing on the final line in the image data, the image data of a subsequent line is necessary. That is, one band of image data can be stored to the band memory 108 only after three bands of image data are stored into the band memory 107.

FIG. 4 is a timing chart illustrating the operation of the facsimile machine shown in FIG. 3. In FIG. 4, the letter "B" indicates a band, whereas "L" indicates a line. As shown in FIG. 4, the facsimile machine according to the comparative example, between the start of the image reduction processing (time T11) after the reduction factor is determined through capability exchange with the communication partner device and the start of the facsimile signal transmission (time T12), the ASIC 103 needs to perform the image reduction processing on seven bands of image data, and the ASIC 104 needs to perform the image reduction processing on three bands of image data. Therefore, the facsimile machine according to the comparative example requires a relatively long time before the transmission of facsimile signal starts. Naturally, the facsimile machine according to the comparative example incurs an unnecessary communication charge for a time period elapsed between the capability exchange with the communication partner device and the start of facsimile signal transmission.

In addition, when only one ASIC is available for the image reduction processing at a reduction factor of 50% in the sub-scanning direction, the ASIC needs to perform the image reduction processing twice at a reduction factor of 50% in order to acquire image ultimately reduced at a reduction factor of 25%.

Embodiment 2

FIG. 5 is a block diagram showing the structure of a facsimile machine 10 according to Embodiment 2 of the present disclosure. In the facsimile machine 10 shown in FIG. 5, the image processing device 11 uses one ASIC to reduce image data at a reduction factor of 25% and transmits the resulting image data to a communication partner device. In FIG. 5, the same reference signs as those in FIG. 1 are used to denote the same or corresponding components.

In Embodiment 2, the following is performed.

(a) The ASIC 3 performs the first stage of the image reduction processing at a reduction factor of 50% and stores the resulting image data in the buffer memory 8 that is equal in size to $½^i$ (i=1, for example) of one band.

(b) Immediately after the image data acquired through the first stage of the image reduction processing is stored into the buffer memory 8 that is equal in size to $½^i$ of one band, the ASIC 3 reads the image data from the buffer memory 8 and performs the second stage of the image reduction processing at a reduction factor of 50% on the read image data and stores the resulting image data into the buffer memory 9 that is equal in size to $½^{i+1}$ (i+1=2, for example) of one band.

In Embodiment 2, the processing performed by the ASIC 4 in Embodiment 1 is performed by the ASIC 3. The other operations performed in Embodiment 2 are the same as those described in Embodiment 1, and thus a description thereof is omitted.

As has been described above and similarly to Embodiment 1, Embodiment 2 described above can ensure that the facsimile machine can start transmission of a facsimile signal promptly even when one ASIC 3 performs a plurality of stages of image reduction processing.

Figure 6:
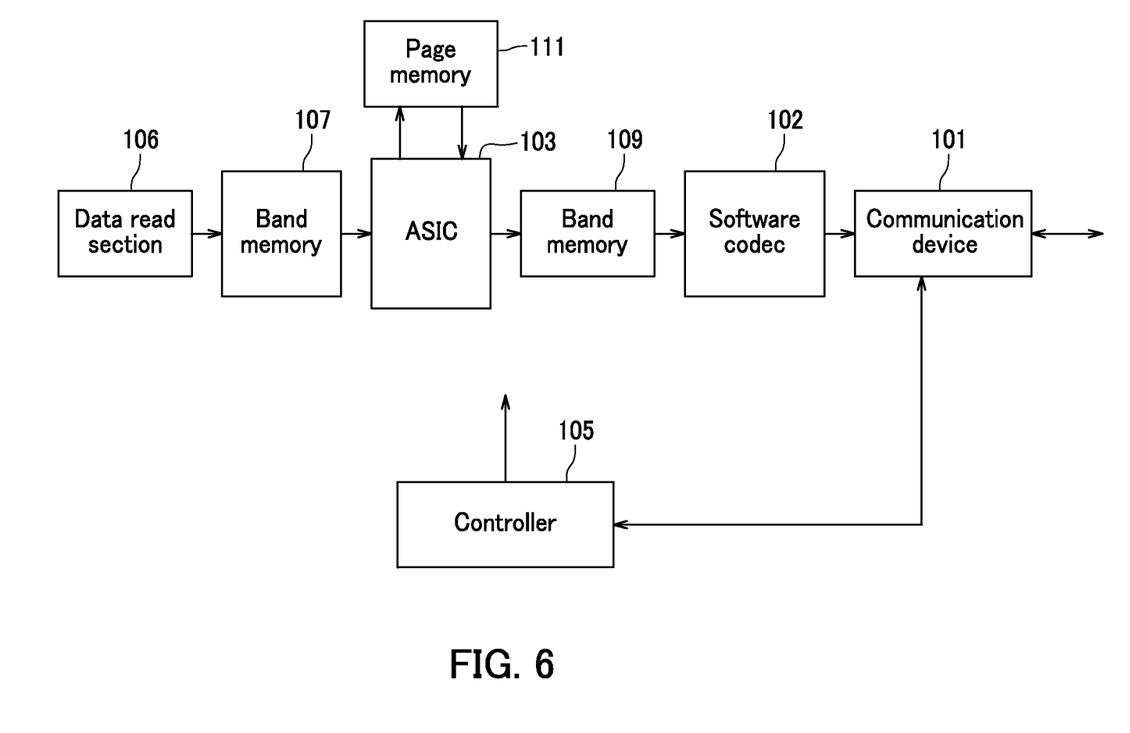
FIG. 6 is a block diagram showing the structure of a facsimile machine according to a comparative example for Embodiment 2.

With reference to FIG. 6, the following describes a comparative example against Embodiment 2. FIG. 6 is a block diagram showing an example of the structure of a facsimile machine that transmits image data after reducing to 25% of the initial size by using one ASIC. The ASIC reduces image data to 50% in the sub-scanning direction.

In this case, as shown in FIG. 6, the ASIC 103 cannot start the second stage of the image rededication processing until completing the first stage of the image reduction processing. Therefore, the ASIC 103 stores image data acquired through the first stage of the image reduction processing to a page memory 111. After completing the first stage of the image reduction processing (in other words, after completing the image reduction processing on an entire image region of the original image), the ASIC 103 reads the image data having been reduced to 50% of the original size and performs the second stage of the image reduction processing.

Figure 7:
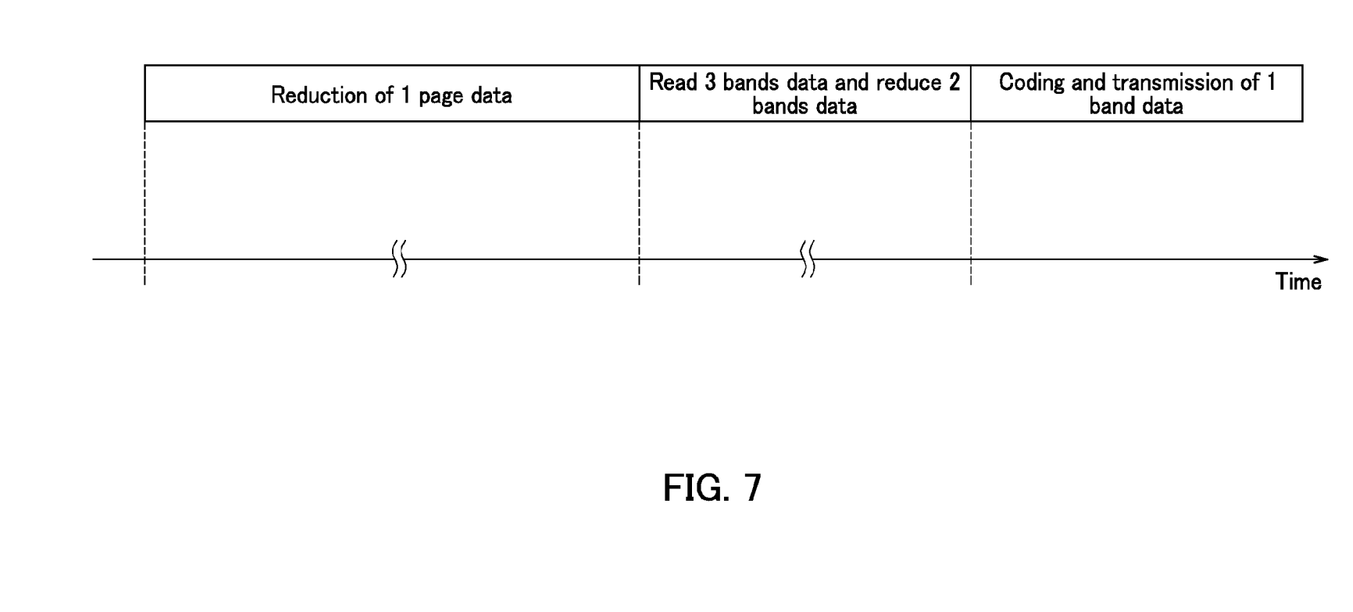
FIG. 7 is a timing chart illustrating operation of the facsimile machine having the structure shown in FIG. 6.

FIG. 7 is a timing chart illustrating the operation of the image processing device included in the facsimile machine according to the comparative example shown in FIG. 6. As shown in FIG. 7, the facsimile machine according to the comparative example starts transmission of a facsimile signal after completing the image reduction processing of one page. This results in a longer time period between the capability exchange with a communication partner device and the start of a facsimile signal transmission. Therefore, the facsimile machine according to the comparative example incurs an unnecessary communication charge for a time period elapsed between the capability exchange with the communication partner device and the start of facsimile signal transmission.

Although the embodiments described above are preferable examples of the present disclosure, the present disclosure is not limited to the specific embodiments. Various modified embodiments including the following may be made without departing from the essence of the present disclosure.

For example, Embodiments 1 and 2 both perform the image reduction processing to a reduction factor of 50% in two stages. Yet, the image reduction processing may include any number of stages other than two.

In addition, Embodiments 1 and 2 performs the image reduction in the sub-scanning direction. However, the ASICs 3 and 4 may each perform image reduction processing in the main scanning direction. In this case, one line (band) of image data after the image reduction will have a size corresponding to the reduction factor in the main scanning direction. The buffer memories 8 and 9 will have size sufficient for storing image data of the size.

What is claimed is:

1. An image processing device that performs image reduction processing of reducing an image in a sub-scanning direction at a reduction factor of $½^N$, where N>1, the image processing device comprising:
one or more hardware processing circuits each configured to perform image reduction at a reduction factor of 50%, wherein
when the one or more hardware processing circuits perform the image reduction processing in N stages each at the reduction factor of 50%,
one of the one or more hardware processing circuits performs an i-th stage of the image reduction processing at the reduction factor of 50%, where N−1≥i≥1, and stores image data acquired through the i-th stage of the image reduction processing into a buffer memory that is equal in size to $½^i$ of one band, and
one of the one or more hardware processing circuits performs, after the image data acquired through the i-th stage of the image reduction processing is stored into the buffer memory, an (i+1)-th stage of the image reduction processing at the reduction factor of 50% on the image data acquired through the i-th stage of the image reduction processing and stores image data acquired through the (i+1)-th stage of the image reduction processing into a buffer memory that is equal in size to $½^{i+1}$ of one band, and
when the number of the one or more hardware processing circuits is equal to N,
an i-th hardware processing circuit out of the N hardware processing circuits performs the i-th stage of the image reduction processing at the reduction factor of 50%, where N−1≥i≥1, and stores the image data acquired through the i-th stage of the image reduction processing into the buffer memory that is equal in size to $½^i$ of one band, and an (i+1)-th hardware processing circuit out of the N hardware processing circuits performs, after the image data acquired through the i-th stage of the image reduction processing is stored into the buffer memory that is equal in size to $½^i$ of one band, the (i+1)-th stage of the image reduction processing at the reduction factor of 50% on the image data acquired through the i-th stage of the image reduction processing and stores the image data acquired through the (i+1)-th stage of the image reduction processing into the buffer memory that is equal in size to $½^{i+1}$ of one band.

2. A facsimile machine comprising:

the image processing device according to claim 1;

a codec configured to convert image data into a facsimile signal, the image data having been generated and stored into the buffer memory that is equal in size to $½^{i+1}$ of one band by the image processing device; and a communication device configured to send the facsimile signal generated by the codec.

3. The facsimile machine according to claim 2, further comprising a controller configured to specify a value of N through capability exchange performed by the communication device with a communication partner device.

* * * * *